(12) United States Patent
Gharib

(10) Patent No.: US 11,407,493 B2
(45) Date of Patent: Aug. 9, 2022

(54) ROTATING SHROUD FOR ROTATOR BLADE SYSTEMS

(71) Applicant: California Institute of Technology, Pasadena, CA (US)

(72) Inventor: Morteza Gharib, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/464,499

(22) Filed: Sep. 1, 2021

(65) Prior Publication Data

US 2022/0063791 A1 Mar. 3, 2022

Related U.S. Application Data

(60) Provisional application No. 63/073,379, filed on Sep. 1, 2020.

(51) Int. Cl.
*B64C 11/06* (2006.01)
*B64C 11/00* (2006.01)

(52) U.S. Cl.
CPC ............ *B64C 11/001* (2013.01); *B64C 11/06* (2013.01)

(58) Field of Classification Search
None
See application file for complete search history.

(56) References Cited

U.S. PATENT DOCUMENTS

| | | | |
|---|---|---|---|
| 4,289,450 A * | 9/1981 | Kling | B64C 11/001 416/189 |
| 5,183,382 A | 2/1993 | Carroll | |
| 5,351,913 A * | 10/1994 | Cycon | B64C 39/024 416/115 |
| 5,454,531 A | 10/1995 | Melkuti | |
| 6,375,416 B1 * | 4/2002 | Farrell | F04D 29/526 415/173.1 |
| 7,712,701 B1 * | 5/2010 | Ehrmantraut | B64C 27/20 244/17.23 |
| 2004/0113013 A1 | 6/2004 | Pica | |
| 2010/0166556 A1 * | 7/2010 | Kirtley | F03D 1/06 416/179 |
| 2014/0151494 A1 * | 6/2014 | Cvrlje | B64C 27/26 244/6 |
| 2014/0321968 A1 * | 10/2014 | Kreitmair-Steck | B64C 27/82 415/228 |

(Continued)

FOREIGN PATENT DOCUMENTS

| | | |
|---|---|---|
| CN | 108545178 A | 9/2018 |
| WO | 2005072233 A2 | 8/2005 |
| WO | 2022051409 A1 | 3/2022 |

OTHER PUBLICATIONS

International Search Report and Written Opinion for International Application No. PCT/US2021/048731, Search completed Dec. 23, 2021, dated Dec. 24, 2021, 7 Pgs.

*Primary Examiner* — Michael Lebentritt
(74) *Attorney, Agent, or Firm* — KPPB LLP

(57) ABSTRACT

A system and method for improving the flight control and efficiency of an aerial vehicle. Many embodiments are directed to a rotor-shroud assembly system where a plurality of rotor blades are connected to the internal side of a shroud and are set up to pivot through the use of a pitching mechanism. The entire assembly is configured to rotate when attached to a motor.

16 Claims, 3 Drawing Sheets

(56) References Cited

U.S. PATENT DOCUMENTS

| | | | |
|---|---|---|---|
| 2016/0102499 A1* | 4/2016 | Stewart | F03B 13/02 |
| | | | 415/119 |
| 2016/0159458 A1 | 6/2016 | Linch et al. | |
| 2019/0153992 A1* | 5/2019 | Schurtenberger | F03B 17/061 |
| 2020/0141418 A1* | 5/2020 | Aiello | F04D 1/10 |
| 2021/0123350 A1* | 4/2021 | Mittendorf | F01D 5/20 |

* cited by examiner

ROTATING SHROUD FOR ROTATOR BLADE SYSTEMS

This application claims priority to U.S. Provisional application 63/073,379 filed on Sep. 1, 2020. The disclosure of which are included herein by reference in their entirety.

FIELD OF THE INVENTION

The present invention generally relates to rotor systems that can be implemented in a number of different forms. More specifically, it relates to shroud systems that can be used with respect to rotors.

BACKGROUND

Many Vertical Take Off and Landing vehicles as well as vehicles whose primary lifting mechanism is a rotary blade will utilize some type of shroud or covering with respect to the individual rotors. Even small unmanned aerial vehicles, like drones, can use partial shrouds to cover portions of the rotor(s) to prevent injury to humans or damage from external sources. Shrouds can be used for other reasons including improved aerodynamics and noise reduction.

A typical approach to shrouds or rotary blade coverings is to have a fixed shroud that surrounds the rotor blade. This can be done in any number of methods such as a shroud that is an effective extension of the body portion of the aircraft. Other methods may be a separate shroud that is connected to the body of the aircraft in some fashion. Accordingly, the shroud will remain in a fixed position with respect to the rotor blade(s). The fixed shroud system typically requires tight tolerances between the rotor blade(s) and the shroud to help reduce noise produced from the rotor blade(s). However, in order to maintain the tight tolerances, the shrouds require larger fixed structures to hold them within the tight tolerances. As previously described, the larger structures usually are fixed to the vehicle in some fashion. Additionally, the requirement for larger structures typically result in larger vehicle size and different vehicle configurations to accommodate the shroud and maintain aerodynamics.

SUMMARY OF THE INVENTION

Many embodiments are directed to a rotor blade shroud that is connected to the outer tip portion of a rotor blade and is configured to rotate in conjunction with the rotor blade of a rotary system. In various embodiments, the tips of the rotor blade are rotatably connected to the shroud such that the pitch of the rotor blade can be adjusted. The adjustability of the pitch of the rotor blade can be advantageous in the overall control of the vehicle because it can allow for directional and thrust control to be generated from the rotors in a more efficient manner. Additionally, the use of an attached or fixed shroud on a rotor can reduce the overall weight of a vehicle thereby improving the overall efficiency of the vehicle.

Accordingly, many embodiments of a rotor-shroud assembly have a central hub configured to rotate about a central axis with a plurality of rotor blades circumferentially disposed on and moveably connected to the central hub. Additionally, each of the plurality of rotor blades has a first end pivotably connected to the central hub and an elongated body extending outwardly from central hub towards a second end. The second end is pivotably connected to a shroud that circumscribes the plurality of rotor blades, where each of the plurality of rotor blades can rotate about an elongated axis extending between the first and second end and perpendicular to the pivot connection with the shroud. The shroud is configured to rotate with the rotation of the rotors about the central axis.

In other embodiments, the rotor-shroud assembly has a pitching mechanism, wherein the pitching mechanism is connected to at least the first end of each of the plurality of rotor blades and adjusts the pitch of each of the rotor blades.

In yet other embodiments, each of the plurality of rotor blades are removable.

In still other embodiments, the rotor-shroud assembly has a motor assembly connected to the central hub, wherein the motor assembly rotates the central hub, the rotor blades, and the shroud.

In still yet other embodiments, the shroud has a cross sectional profile of an airfoil such that the rotation of the shroud directs airflow towards each of the plurality of rotor blades.

In other embodiments, each of the rotor blades are connected to the shroud through a bearing.

In yet other embodiments, the bearing is disposed within a body of the shroud.

In still other embodiments, the pitching mechanism is a swashless pitching mechanism.

Other embodiments are directed to an aerial vehicle that has a body and a plurality of rotor-shroud assemblies connected to the body of the vehicle. Each of the plurality of rotor-shroud assemblies has a central hub configured to rotate about a central axis and a plurality of rotor blades circumferentially disposed on and moveably connected to the central hub. Each of the plurality of rotor blades has a first end pivotably connected to the central hub and an elongated body extending outwardly from central hub towards a second end. The second end is pivotably connected to a shroud that circumscribes the plurality of rotor blades and each of the plurality of rotor blades can rotate about an elongated axis extending between the first and second end and perpendicular to the pivot connection with the shroud. The shroud is configured to rotate with the rotation of the rotors about the central axis.

In yet other embodiments, the aerial vehicle has a pitching mechanism, wherein the pitching mechanism is connected to at least the first end of each of the plurality of rotor blades and adjusts the pitch of each of the rotor blades.

In still other embodiments, the aerial vehicle has a motor assembly connected to the central hub, wherein the motor assembly rotates the central hub, the rotor blades, and shroud.

In still yet other embodiments, the pitching mechanism is a swashless pitching mechanism.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods or a rotating shroud are presented. Many embodiments are directed to a rotor blade shroud that is connected to the outer tip portion of a rotor blade and is configured to rotate in conjunction with the rotor blade of a rotary system. In various embodiments, the tips of the rotor blade are rotatably connected to the shroud such that the pitch of the rotor blade can be adjusted. The adjustability of the pitch of the rotor blade can be advantageous in the overall control of the vehicle because it can allow for directional and thrust control to be generated from the rotors in a more efficient manner. Additionally, the use of an attached or fixed shroud on a rotor can reduce the overall weight of a vehicle thereby improving the overall efficiency of the vehicle.

As previously discussed, typical shrouded rotors or blades will be fixed or in a fixed position relative to the rotating blade. Their use has a number of functions such as noise reduction and aerodynamics. Typical rotor shrouds are connected to adjacent structures in order to maintain the very tight tolerances between the shroud and the rotor blades. The adjacent structures typically are connected to a vehicle and tend to be larger and bulkier than desired. This tends to increase the weight of the vehicle which can create issues with efficiency and aerodynamics.

In some applications, shrouds have been attached to the rotor blade(s) in an effort to help reduce noise surrounding the rotor. For example, U.S. Pat. No. 5,183,382, '382 patent, illustrates a "rotating fan and shroud assembly" that is designed to reduce the noise produced from the fan blades. The '382 patent is primarily focused on a fan shroud assembly for use in the automobile industry and not necessarily for the aircraft industry. Additionally, the shroud is connected to the core of the assembly rather than each of the fan blades.

In contrast, many embodiments shown herein, are directed to a rotor and shroud assembly in which the rotor blades are connected to the shroud itself such that the shroud will rotate with the rotation of the blades. Additionally, each of the rotor blades can be configured to pivot or rotate along a perpendicular axis with relation to the shroud. The pivotable rotor blades can provide a method to adjust the pitch of the blades during flight without affecting the function of the shroud.

Figure 1:
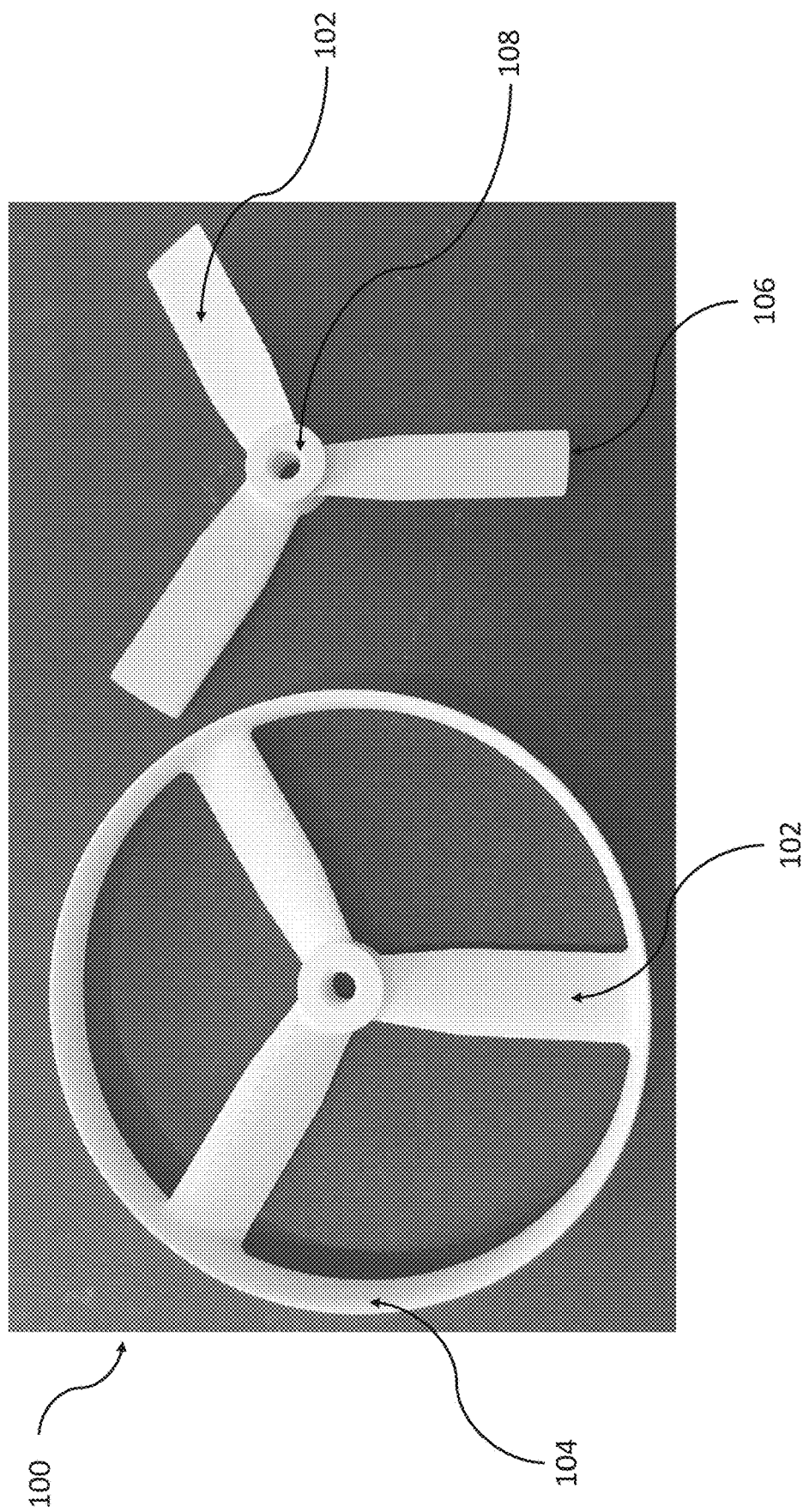
FIG. 1A illustrates a tri-rotor in accordance with known rotor systems
FIG. 1B illustrates a tri-rotor connected to a shroud and configured to rotate with the tri-rotor in accordance with embodiments of the invention.

Turning now to the figures, FIGS. 1A and 1B illustrates a rotor blade assembly with a tri-rotor blade set up connected to a shroud as well as a separated tri-rotor blade assembly. FIG. 1A illustrates an entire assembly 100 with a tri-rotor blade 102 connected to a shroud 104 a the tips 106 of each of the rotor blades 102. Such assemblies may be similar to those seen in a typical turbine type configuration. The rotor blades 102 remain in a fixed position with respect to the central hub 108 and the shroud 104. This can produce a fixed force or direction of the force produced from the rotation of the rotor blades 102.

Figure 2:
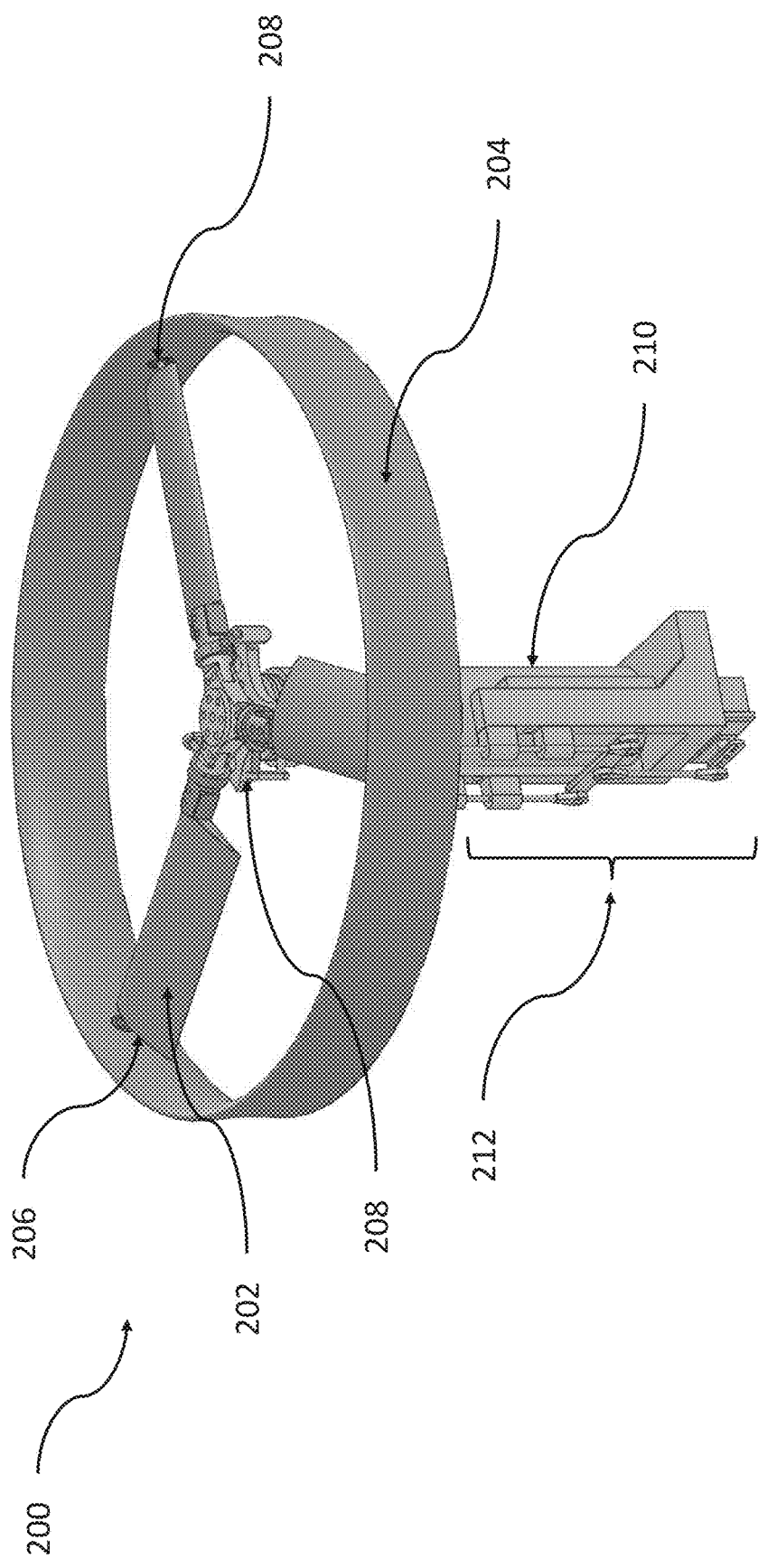
FIG. 2 illustrates a tri-rotor configuration connected to a shroud at the tips in accordance with embodiments of the invention.

In contrast to a fixed rotor blade configuration, many embodiments are configured to have rotor blades moveably connected to the shroud. For example, FIG. 2 illustrates a rotor blade/shroud assembly 200 with three rotor blades 202 connected to a shroud 204. Each of the rotor blades 202 are connected to the shroud 204 at the tip 206 and the shroud 204 surrounds the blades 202 such that the blades 202 are positioned within the inner diameter of the shroud 204. In various embodiments, the rotor blades are connected to the shroud 204 through a bearing or bushing 208 that will allow the rotor to pivot or rotate about a longitudinal axis. Effectively the pivoting of the rotor blades 202 is adjusting the pitch of the blade. The adjustment of the pitch of a blade can be used to control the movement of the vehicle.

Each of the rotor blades 202 can be generally connected to a central hub 208 that can be connected to both a motor assembly 210 and a pitching mechanism 212. The pitch or pivot of control of the rotor blades 202 can be adjusted by any number of pitching mechanisms 212 which can also be controlled or powered by the motor 210 that is used to power the rotation of the blades 202. In various embodiments, the blades 202 can be removable such that the can be easily exchanged for maintenance and/or adjustment. For example, rotor blades can have a number of different profiles that operate to produce different amounts of thrust and/or lift. Accordingly, various embodiments can allow for the change of rotor blades to produce different amounts of thrust and/or lift.

Figure 3:
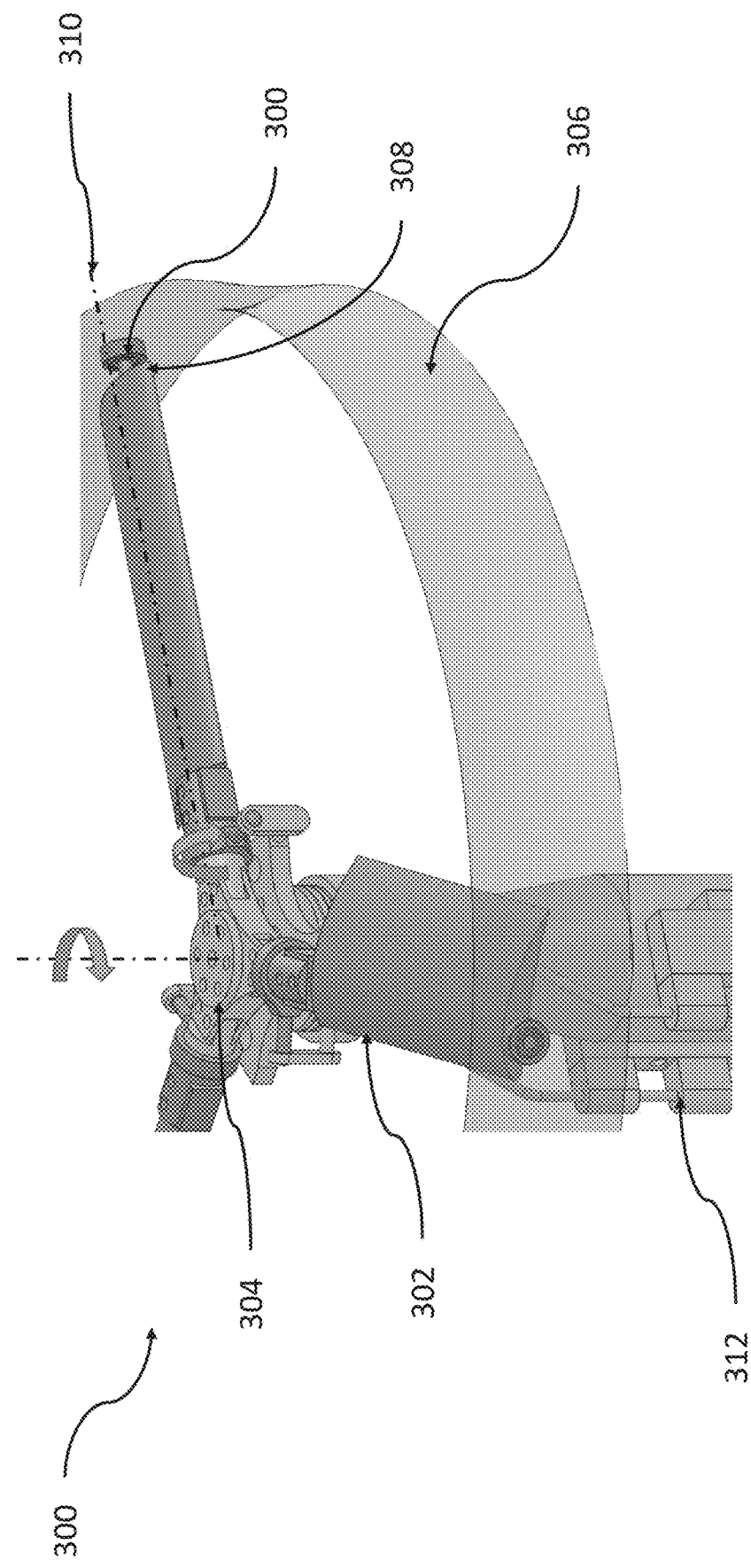
FIG. 3 illustrates a shroud/rotor connection system in accordance with embodiments of the invention.

FIG. 3 further illustrates an embodiment of a rotating shroud assembly 300 with moveable rotor blades 302. As can be seen, the rotor blades 302 are connected to a central hub 304 that has a central axis 305 about which the hub can rotate and rotate the rotator blades 302. Accordingly, because the blades 302 are connected to a shroud 306 the rotation of the hub and blades will rotate the shroud as well. As previously described, this can provide a number of advantages over a fixed shroud, both in reducing noise and weight as well as assist in the flight efficiency.

Additionally, as previously described, the rotor blades can be connected to the shroud at the tips 308 of the blades with a bearing or bushing such that it can pivot or rotate about a pitch axis 310. The bearing or bushing attachment point can be positioned within the shroud 306 such that the profile of the bearing or bushing does not affect the aerodynamics that can be produced from the shroud. The pivoting or pitch adjustments of the rotor blades 302 can be done with any number of pitching mechanisms 312 and can be connected to the rotor blades 302 in any number of ways. For example, some embodiments may utilize a swashless pitching mechanism. As can be appreciated, embodiments of the shroud/rotor assembly can be configured with any number of rotor blades and is not limited to embodiments illustrated herein.

As can be appreciated from the ability to interchange the rotor blades, many embodiments are directed towards adaptability. As such, some embodiments may incorporate a number of different shroud designs and/or cross sections. Since the shroud can be configured to rotate with the rotation of the rotor blades, it will likewise be exposed to airflow in flight and can likewise be used and/or modified to direct the flow of air towards the rotors. For example, some embodiments may implement the use of a shroud with a cross sectional profile similar to an airfoil. This can aid in the directional control of a vehicle by improving the airflow over the rotor blades. Additionally, if the rotor-shroud assembly is rotatable with respect to the vehicle then the shroud shape can also help to provide lift, thereby improving the overall functionality of the vehicle.

Although various embodiments are described herein, it should be understood that individual components can be used together or in separate configurations in accordance with the various embodiments described herein. Furthermore, many embodiments may be incorporated in part or in conjunction with other components, into an aerial vehicle. Additionally, it can be appreciated that many embodiments may incorporate one or more custom components or components that are considered off the shelf and readily available such as control computers and/or motors.

SUMMARY & DOCTRINE OF EQUIVALENTS

As can be inferred from the above discussion, the above-mentioned concepts can be implemented in a variety of arrangements in accordance with embodiments of the invention. Specifically, a rotor/shroud system having multiple rotors movably connected to a shroud such that the rotation of the rotors causes a similar rotation of the shroud while allowing the pitch of the rotors to be adjusted. The movability of the rotors with respect to the shroud can allow for improved pitch control in the vehicle.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A rotor-shroud assembly comprising:
a central hub configured to rotate about a central axis,
a plurality of rotor blades circumferentially disposed on and moveably connected to the central hub, wherein each of the plurality of rotor blades has a first end pivotably connected to the central hub and an elongated body extending outwardly from central hub towards a second end,
wherein the second end is pivotably connected to a shroud that circumscribes the plurality of rotor blades, wherein each of the plurality of rotor blades can rotate about an elongated axis extending between the first and second end and perpendicular to the pivot connection with the shroud and
wherein the shroud is configured to rotate with the rotation of the rotors about the central axis.

2. The rotor-shroud assembly from claim 1, further comprising a pitching mechanism, wherein the pitching mechanism is connected to at least the first end of each of the plurality of rotor blades and adjusts the pitch of each of the rotor blades.

3. The rotor-shroud assembly of claim 1, wherein each of the plurality of rotor blades are removable.

4. The rotor-shroud assembly of claim 1, further comprising a motor assembly connected to the central hub, wherein the motor assembly rotates the central hub, the rotor blades, and shroud.

5. The rotor-shroud assembly of claim 1, wherein the shroud has a cross sectional profile of an airfoil such that the rotation of the shroud directs airflow towards each of the plurality of rotor blades.

6. The rotor-shroud assembly of claim 1, wherein each of the rotor blades are connected to the shroud through a bearing.

7. The rotor-shroud assembly of claim 6, wherein the bearing is disposed within a body of the shroud.

8. The rotor-shroud assembly of claim 2, wherein the pitching mechanism is a swashless pitching mechanism.

9. An aerial vehicle comprising:
a body; and
a plurality of rotor-shroud assemblies connected to the body of the vehicle wherein each of the plurality of rotor-shroud assemblies comprise a central hub configured to rotate about a central axis,
a plurality of rotor blades circumferentially disposed on and moveably connected to the central hub, wherein each of the plurality of rotor blades has a first end pivotably connected to the central hub and an elongated body extending outwardly from central hub towards a second end,
wherein the second end is pivotably connected to a shroud that circumscribes the plurality of rotor blades, wherein each of the plurality of rotor blades can rotate about an elongated axis extending between the first and second end and perpendicular to the pivot connection with the shroud and
wherein the shroud is configured to rotate with the rotation of the rotors about the central axis.

10. The aerial vehicle of claim 9, further comprising a pitching mechanism, wherein the pitching mechanism is connected to at least the first end of each of the plurality of rotor blades and adjusts the pitch of each of the rotor blades.

11. The aerial vehicle of claim 9, wherein each of the plurality of rotor blades are removable.

12. The aerial vehicle of claim 9, further comprising a motor assembly connected to the central hub, wherein the motor assembly rotates the central hub, the rotor blades, and shroud.

13. The aerial vehicle of claim 9, wherein the shroud has a cross sectional profile of an airfoil such that the rotation of the shroud directs airflow towards each of the plurality of rotor blades.

14. The aerial vehicle of claim 9, wherein each of the rotor blades are connected to the shroud through a bearing.

15. The aerial vehicle of claim 14, wherein the bearing is disposed within a body of the shroud.

16. The aerial vehicle of claim 10, wherein the pitching mechanism is a swashless pitching mechanism.

* * * * *